United States Patent
Nakamura

(10) Patent No.: US 8,272,016 B2
(45) Date of Patent: Sep. 18, 2012

(54) BROADCAST RECEIVING SYSTEM

(75) Inventor: Yasufumi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 12/261,385

(22) Filed: Oct. 30, 2008

(65) Prior Publication Data

US 2009/0204999 A1     Aug. 13, 2009

(30) Foreign Application Priority Data

Feb. 7, 2008   (JP) ................................. 2008-027438

(51) Int. Cl.
*H04N 5/445* (2006.01)
*H04N 7/173* (2006.01)

(52) U.S. Cl. .............. 725/58; 725/38; 725/61; 725/134; 725/142

(58) Field of Classification Search .................... 725/37, 725/38, 58, 61, 134, 142
See application file for complete search history.

(56) References Cited

U.S. PATENT DOCUMENTS

| | | | | |
|---|---|---|---|---|
| 5,592,551 | A * | 1/1997 | Lett et al. | 380/211 |
| 7,426,467 | B2 * | 9/2008 | Nashida et al. | 704/275 |
| 2003/0208763 | A1 * | 11/2003 | McElhatten et al. | 725/58 |
| 2006/0036589 | A1 * | 2/2006 | Okuda et al. | 707/3 |
| 2007/0094689 | A1 * | 4/2007 | McElhatten et al. | 725/58 |
| 2007/0250895 | A1 * | 10/2007 | Yamada | 725/134 |
| 2007/0300253 | A1 * | 12/2007 | Kawai et al. | 725/38 |

FOREIGN PATENT DOCUMENTS

| | | |
|---|---|---|
| JP | 11-215460 | 8/1999 |
| JP | 2005-229510 | 8/2005 |

* cited by examiner

*Primary Examiner* — Kieu Oanh T Bui
(74) *Attorney, Agent, or Firm* — Fujitsu Patent Center

(57) ABSTRACT

A reservation recording module registers program information in a reserved program EPG database and a restriction period in a restriction period setting information. A reserved program keyword extracting module extracts an associative keyword from the program information registered in the reserved program EPG database and registers the associative keyword in an associative keyword database. An information content analyzing module extracts a keyword group from the program information about a now-broadcasting program in electronic program guide (EPG) data. An associated information restriction period determining module specifies as a restriction target program, only a not-yet-viewed program satisfying the restriction period in the respective programs registered in the reserved program EPG database. A program related information determining module calculates, for every restriction target program, an association level between the keyword group registered in the associative keyword database and the keyword group extracted by the information content analyzing module. If there exists the restriction target program with the association level being higher than a predetermined threshold value, an alarm issuing module 39 outputs an alarm message on a display.

8 Claims, 13 Drawing Sheets

FIG. 3

RESERVED PROGRAM EPG DB

| RESERVED PROGRAM ID | PROGRAM NAME | START DATE/TIME | PROGRAM LENGTH | GENRE | DETAILS OF PROGRAM | CHANNEL |
|---|---|---|---|---|---|---|
| 1 | MY POWER OF MEMORY | 2007/07/05 13:00:00 | 60 MIN 00 SEC | DRAMA | STORY OF OLD PERSON GETTING A STATE OF HAVING ONLY 3-MIN SUSTAINABILITY OF POWER OF MEMORY (THE THIRD INSTALLMENT) STARRING ROLE: KATSUO NOMURA | MHK |
| 2 | MORNING NEWS "ASAYON" | 2007/07/05 04:00:00 | 30 MIN 00 SEC | NEWS | FRESH NEWS IS DELIVERED. MAIN CASTER: HIROSHI KUREMER | SUNSET TV |
| 3 | BASEBALL BROADCAST | 2007/07/18 19:00:00 | ONE HOUR 45 MIN 00 SEC | SPORTS | HANSHIN VERSUS GIANTS COMMENTATOR: SHIGEO NAGASHIMA | JAPAN TV |
| ... | ... | ... | ... | ... | ... | ... |

ALREADY-RECORDED PROGRAM DB 42

| RECORDED PROGRAM ID | PROGRAM NAME | START DATE/TIME | PROGRAM LENGTH | GENRE | DETAILS OF PROGRAM | ALREADY-VIEWED FLAG | CHANNEL |
|---|---|---|---|---|---|---|---|
| 1000 | MY POWER OF MEMORY | 2007/06/18 13:00:00 | 60 MIN 00 SEC | DRAMA | STORY OF OLD PERSON GETTING A STATE OF HAVING ONLY 3-MIN SUSTAINABILITY OF POWER OF MEMORY (THE SECOND INSTALLMENT) STARRING ROLE: KATSUO NOMURA | ON | MHK |
| 1001 | MORNING NEWS "ASANAMA" | 2007/06/25 08:00:00 | 30 MIN 00 SEC | NEWS | FRESH NEWS IS DELIVERED. MAIN CASTER: KOTARO TAWARA | OFF | SUNSET TV |
| 1002 | CASTLE TOWER ON FIRE | 2007/06/28 23:00:00 | ONE HOUR 45 MIN 00 SEC | MOVIE | IN-FOCUS WORK DEPICTING RIVALRY BETWEEN LOCAL BARONS IN THE WARRING STATES PERIOD FROM INNOVATIVE ANGLE. RELEASED IN JANUARY, 2006. JAPAN. DIRECTOR: STEVEN COPPORI STARRING ROLE: AKIRA SHIRASAWA | OFF | BS13 |
| ... | ... | ... | ... | ... | ... | ... | ... |

FIG. 5

RESTRICTION PERIOD SETTING INFORMATION 46

| SETTING NAME | SETTING CONTENTS | TARGET PROGRAM ID |
|---|---|---|
| ONE DAY AFTER END | RESTRICTED FOR 24 HOURS AFTER END OF PROGRAM | 1, 10, 23, 28, ⋯ |
| ONE WEEK AFTER END | RESTRICTED FOR 7 DAYS AFTER END OF PROGRAM | 2, 11, 39, 124, ⋯ |
| TILL VIEWED | RESTRICTED TILL END OF VIEWING PROGRAM | 3, 223, 1092, ⋯ |
| ⋮ | ⋮ | ⋮ |

FIG. 6

ASSOCIATIVE KEYWORD DB 43

| RECORDED PROGRAM ID | ASSOCIATIVE KEYWORD 1 | ASSOCIATIVE KEYWORD 2 | ASSOCIATIVE KEYWORD 3 | ASSOCIATIVE KEYWORD 4 | ASSOCIATIVE KEYWORD 5 | ... |
|---|---|---|---|---|---|---|
| 1 | MY POWER OF MEMORY | AGED | POWER OR MEMORY | OLD PERSON | KATSUO NOMURA | ... |
| 2 | MORNING NEWS "ASAYON" | HIROSHI KUREMER | | | | ... |
| 3 | BASEBALL BROADCAST | HANSHIN | GIANTS | SHIGEO NAGASHIMA | | ... |
| ... | ... | ... | ... | ... | ... | ... |
| 1000 | MY POWER OF MEMORY | AGED | POWER OR MEMORY | OLD PERSON | KATSUO NOMURA | ... |
| 1001 | MORNING NEWS "ASANAMA" | FRESH JUICE | KOTARO TAWARA | | | ... |
| 1002 | CASTLE TOWER ON FIRE | STEVEN COPPORI | AKIRA SHIROSAWA | | | ... |
| ... | ... | ... | ... | ... | ... | ... |

FIG. 7

RESTRICTION TARGET PROGRAM LIST

| RECORDED PROGRAM ID |
|---|
| 1000 |
| ⋮ |

BROADCAST RECEIVING SYSTEM

This application claims the benefit of Japanese Patent Application No. 2008-027438 filed on Feb. 7, 2008 in the Japanese Patent Office, the disclosure of which is herein incorporated in its entirety by reference.

FIELD OF THE INVENTION

The present invention relates to a broadcast receiving system that records, based on electronic program guide (EPG) data, a TV-broadcasted program on a storage device, and reproduces the recorded program according to an operation of a viewer.

DESCRIPTION OF THE PRIOR ART

In recent years, a TV broadcasting system has been in transit to a digital system from a conventional analog system. As a result, a channel can be multiplexed by more effectively utilizing bandwidths than the conventional analog broadcasting. Moreover, the bandwidths of wavelengths of communication satellite signals can be also utilized for TV broadcasting, and further cable broadcasting using a cable such an optical cable becomes popularized. Accordingly, there are by far more categories and the greater number of programs to be broadcasted, and hence it is indispensable to use a video recorder for viewing want-to-view programs thoroughly.

By the way, the programs to be broadcasted include that televised for providing enjoyment of a process leading to an outcome rather than promptness of reporting the outcome as a sports program. With respect to the programs in the latter case, it is preferable to view the live-broadcasted program as it is with its result being unsettled. If a time zone for the live broadcast is in the daytime on a weekday, a great majority of workers are unable to directly view the live broadcast, and hence there is no alternative but to reserve recording of the program and thereafter reproduce the recorded program to view in nighttime or on a weekend.

In many cases, such programs are recognized valuable when viewed in a state result in unknown. Especially if a viewer enthusiastically supports one athlete or one team and desires for a win thereof, this tendency is considered strong. The viewer having this type of recognition tends to be damped to view the recorded program if knowing a result of a game that is a content of the program before viewing the program. For example, this case is exemplified such that when switching ON a power source of a TV receiver in order to view the recorded program of a game, sports news show is televised at a channel set at that point of time, and the viewer happens to know the result of the game because of the result of the game being reported in the sports news show; and such that the viewer happens to know the game result through Web information on the Internet such as a comment about the program written on an electronic bulletin board or a Web log (blog) by another viewer who has already viewed the program or an e-mail of which content is a comment about the program and which is received by the viewer from his or her friend. It is also said that the same thing is applied to a case where the program is originally a recorded broadcast. In this case, at the channel for broadcasting this program, the broadcast station avoids reporting the result of the game defined as the content of the program before it being televised in many cases. Nevertheless, the viewer happens to frequently know the result of the game from the Web information on the Internet and via the e-mail.

Thus, if the viewer happens to know the result of the game as the content of the program before viewing the program, a tense atmosphere and excitement about the game tend to shrink even when the athlete and the team enthusiastically supported by the viewer won, The tense atmosphere and the excitement about the game get much more shrunk if the athlete and the team enthusiastically supported by the viewer get defeated without any nice scene. Accordingly, when the viewer having such a tendency records the sports broadcast program, it is desirable for the viewer to be isolated from the information about the result thereof.

Note that the necessity for isolating the viewer from the information about the program before viewing is applied also to other categories of programs of which important element is, though the program proceeds toward a certain outcome, a tendency to surprise and unpredictability of the outcome thereof. For example, this type of program is exemplified such as a movie or a drama based on an original scenario, and a so-called viewer-participation program like a quiz program or an audition program, etc. which have a content of choosing one or a few winners.

On the other hand, with respect to a program like current affair news in which the top priority is given to report promptness and which plural channels broadcast, a program such as a documentary, a music program and a language/education program with an absolute value being placed on the content itself rather than freshness of the information, and a program like a dram and a movie produced based on a well-known original work with an enjoyment element being placed on casting and acting/performance of a performer rather than a rough story leading to an outcome, there is generally no obstacle even if the viewer happens to know the content of the program before being viewed. Accordingly, the necessity for isolating the viewer from the information about the content of such a program is low.

In connection with the problems described above, for example, Japanese Patent Laid-Open Publication No. 2005-229510 proposes a configuration in which a video-function built-in TV receiver (broadcast receiving system) including a storage unit and a display unit for video data incorporates a mechanism enabling a content of the recorded program to be avoided from being known by a viewer through zapping the on-broadcasting programs before or in the midst of viewing the recorded program. According to this prior art, similarity between the recoded program and the on-broadcasting program is measured, and, if the similarity is larger than a certain value, a message saying that a related program is broadcasted is displayed on a screen by overlapping the video image of the program. It is therefore feasible to avoid the viewer from viewing the broadcast related to the already-recorded but not-yet-viewed programs.

A mainstream of the video recording system, however, changes to a system for recording digital data on a large-capacity hard disk from the recording system using a magnetic tape capable of recording only 9-hour data at the maximum without any exchange. According to such a system, the program can be recorded offhand without exchanging the medium, and, when unnecessary, the program can be completely erased in several seconds. It is therefore said that a viewing mode of the viewer changes to such a mode that the viewer, after recording the programs at random the viewer has even a slight interest in, reproduces and views only the especially favorite programs when the time allows.

As a result, an often-occurring situation is that the hard disk gets stored with a large capacity of the recording data with no schedule to regenerate the recording data recorded with intention to view but gradually forgotten because of the viewer having no leisure for viewing. Then, if falling into such a situation, according to the video receiving and displaying apparatus disclosed in the prior art, the similarity is measured and a message based on this similarity is displayed irrespective of a viewing possibility with respect to all the stored recording data, and hence the message about the program having already no necessity for isolating the information is displayed uselessly, or alternatively the message is displayed each time the channel is switched over, resulting in occurrence of an obstacle against the normal viewing.

SUMMARY OF THE INVENTION

It is an object of the present invention to provide a broadcast receiving system capable of solving the problems inherent in the prior arts described above and presetting a period for which to give an alarm about information related to the recorded program.

According to the present invention, a channel and a broadcasting time zone of a program designated by a user are registered in a reserved program database, then a condition of a restriction period is set and stored in a storage device, and, with respect to the programs of which the channels and the broadcasting time zone are registered in the reserved program database, a keyword is extracted from program contents contained in the program information and registered in a keyword database. Then, information is acquired from outside of the system, a keyword is extracted by analyzing contents of the acquired information, the channel and the broadcasting time zone are registered in the reserved program database, and the program of which broadcasting time zone is within the restriction period defined under the condition of the restriction period is determined to be a restriction target program. An association level between the keyword registered in the keyword database in the way of being associated with the restriction target program and the keyword extracted by the information content analyzing module is calculated, then it is determined whether or not there is the program with the calculated association level exceeding a predetermined threshold value, and, when determining that there is the program with the association level exceeding the threshold value, an alarm showing this purport is issued.

When configured as described above, the recording reservation is done by registering at least the channel and the broadcasting time zone in the program information on the program specified by the viewer in the reserved program database. Further, simultaneously with or before and after the recording reservation, the condition of the restriction period about the program reserved for the recording is stored in the storage device. With respect to the thus reserved program, one or a plurality of keywords are extracted from the program contents in the program information and registered in the keyword database. On the other hand, if the information is acquired from outside of the system, the keyword is extracted by analyzing this information, with respect to the programs of which broadcasting time zone is within the restriction period defined under the condition of the restriction period in the reserved programs, the association level between the keyword (group) registered in the keyword database and the keyword (group) extracted from the information acquired from outside is calculated, and, if there exists the program with the calculated association level exceeding the predetermined threshold value, an alarm is output. As a result, with respect to only the reserved program of which broadcasting time zone is in the restriction period, the alarm is issued when the information related thereto is acquired from outside. Accordingly, before viewing the reservation-recorded program, an access to the contents (e.g., a result of a game in a sports program) of the program is restricted. Besides, this restriction is made only within the restriction period defined under the preset restriction condition but is not made if over the restriction period. The viewer is not therefore annoyed by the alarm issued due to the program which would not be viewed from now into the future because of being left as it is without being viewed.

According to the present invention having the configuration described above, the period for which the alarm about the information related to the recorded program is issued can be set beforehand.

BRIEF DESCRIPTION OF THE DRAWINGS

These and other objects and advantages of the present invention will become clear from the following description with reference to the accompanying drawings, wherein.

FIG. 3 is a table showing a data structure of a reserved program EPG database.

FIG. 4 is a table showing a data structure of a already-recorded program database.

FIG. 5 is a table showing a data structure of restriction period setting information, FIG. 6 is a table showing a data structure of an associative keyword database.

FIG. 7 is a table showing a data structure of a restriction target program list.

DETAILED DESCRIPTION OF THE PREFERRED EMBODIMENTS

Figure 1:
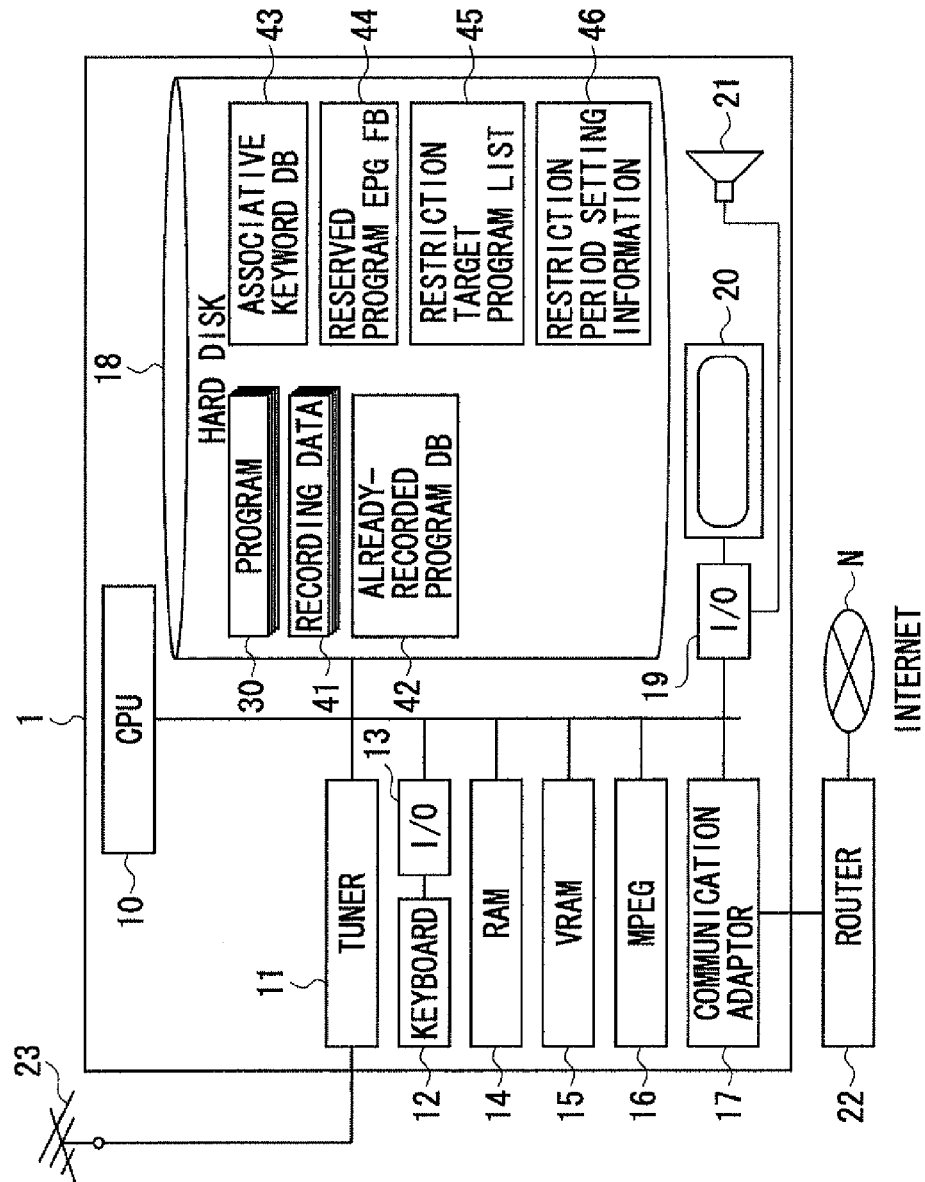
FIG. 1 is a block diagram showing an outline of an architecture of a broadcast receiving system.

An embodiment of a broadcast receiving system will hereinafter be described. The broadcast receiving system in the following discussion is a multifunction TV or a so-called TV personal computer each incorporating a digital broadcast receiving function, a recording function and an Internet connecting function. Note that a system architecture equivalent to the broadcast receiving system according to the embodiment can be configured by connecting a digital TV tuner (a so-called one segment (1 seg) tuner) to the personal computer having the Internet connecting function and installed with various categories of software, and can be also configured as a system in which a display, a loudspeaker and other components are housed in different housings (which is a system constructed of a video recorder and a monitor). These differences are, however, nothing but differences simply in terms of a configuration of how commercial products are combined, and therefore the present invention is limited to neither of these configurations.

Further, the broadcasting system to which the present invention is applied embraces, without being limited to the digital broadcasting, analog broadcasting as far as the analog broadcasting continues. In this case, an electronic program guide (EPG) containing program information is not distributed via the broadcasting but can be distributed via the network, and, since it is sufficient for a viewer to manually reserve the recording, the range to which the present invention is applied is not limited to a specified broadcasting system.

(Architecture of Broadcast Receiving System)

FIG, 1 is a block diagram showing a hardware architecture of the broadcast receiving system according to the present embodiment. As illustrated in FIG, 1, a broadcast receiving system 1 according to the embodiment is configured by a CPU 10, and a tuner 11, interfaces 13, 19, a RAM (Random Access Memory) 14, a VRAM (Video RAM) 15, an MPEG (Moving Picture Experts Group) decoder 16, a communication adaptor 17 and a hard disk 18 which are individually connected via a bus B to the CPU 10, a keyboard 12 connected to the interface 13, a display 20 connected to the interface 19, and a loudspeaker 21 connected to the interface 19.

The CPU 10 is a central processing unit that controls the whole of the broadcast receiving system 1 by executing various categories of programs 30 installed into the hard disk 18.

The tuner 11 is a detector connected to an antenna 23 for ground waves or a satellite (or connected to a cable of a cable TV), and is also a receiver which separates video data and EPG (Electronic Program Guide) carried on broadcasting signals received via the antenna 23 or the cable, and inputs the separated data to the CPU 10. The EPG data is the electronic program guide data organized for defining program information containing a broadcasting channel, a broadcasting time zone (start date/time and a program length) and contents of the broadcast (details of the program) for every program.

The keyboard 12 is a device properly operated by the viewer to input a variety of instructions (commands, data) to the CPU 10.

The RAM 14 is a temporary storage device on which developed is an operating area for the CPU 10 to execute a process for the control.

The VRAM 15 is a video memory on which a picture displayed on the display 20 is developed as an image.

The MPEG decoder 16 is a circuit that expands (decodes) the video data defined as composite signals of MPEG-based video signals and MPEG-based sound (voice) signals carried on the broadcasting signals or read from the hard disk 18.

The communication adaptor 17 is a communication device that converts communication data based on a communication protocol for a network (LAN) down to a router 22 in order to perform the communications with a variety of servers on the Internet N via the router 22 installed outside the broadcasting receiving system.

The display 20 is a video output device that displays the moving picture decoded by the MPEG decoder 16 and generated on the VRAM 15 under the control of the CPU 10, and the loudspeaker 21 is a sound output device that outputs the sound (voice) based on sound signals decoded by the MPEG decoder 16.

Figure 2:
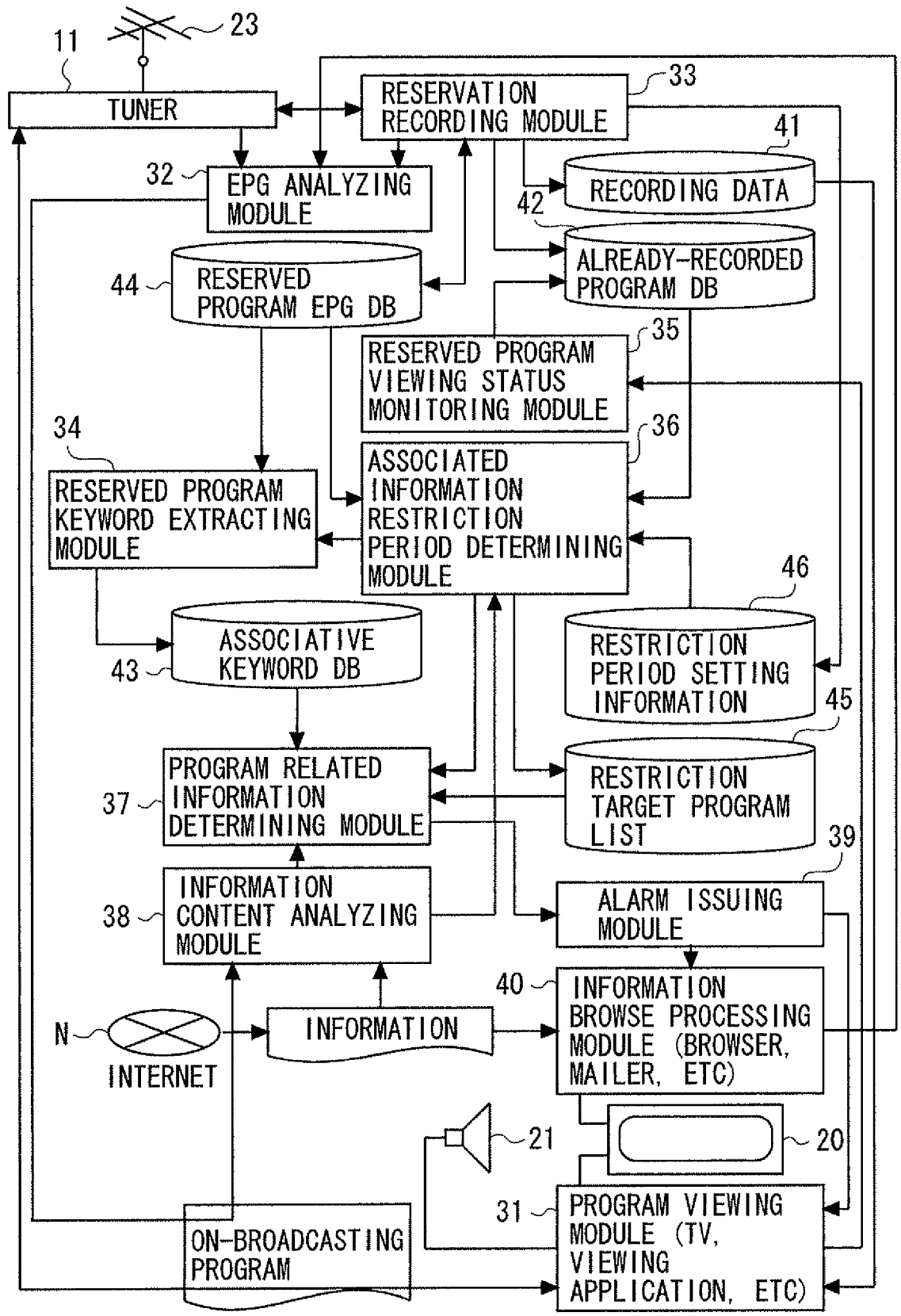
FIG. 2 is a block diagram showing correlations between functions actualized by various categories of programs stored in a hard disk and respective categories of data.

The hard disk 18 is a storage device stored with the various categories of programs 30 and various categories of data. The various categories of programs 30 preinstalled into the hard disk 18 and read/executed by the CPU 10 include, in addition to the programs (an operating system (OS), a Browser program, a Mailer program, driver programs for operating the respective circuits 11-21, etc.) normally incorporated into the personal computer having the Internet connecting function, a variety of programs needed for viewing, recording and reproducing the TV programs. Further, the various categories of data stored in the hard disk 18 include recording data 41, an already-recorded program database 42, an associative keyword database 43, a reserved program EPG database 44, a restriction target program list 45 and restriction period setting information 46, which are generated or read/written by the CPU 10 executing the various categories of programs in order to view, record and reproduce the TV programs, FIG. 2 is a function block diagram showing correlations between the individual functions realized by the CPU 10 executing the various categories of programs 30 needed for viewing, recording and reproducing the TV programs, the various categories of data stored in the hard disk 18 and the respective circuit components. As shown in FIG. 2, the functions realized by the various categories of programs 30 needed for viewing, recording and reproducing the TV programs include a program viewing module 31, an EPG analyzing module 32, a reservation recording module 33, a reserved program keyword extracting module 34, a recorded program viewing status monitoring module 35, an associated information restriction period determining module 36, a program related information determining module 37, an information content analyzing module 38 and an alarm issuing module 39. Note that an information browse processing module 40 embraces the functions realized by the Browser program and the Mailer program. The respective functions 31 40 and the various categories of data 41-46 will hereinafter be individually described with reference to FIG. 2.

To start with, the information browse processing module 40 downloads a desired category of Web data from an unillustrated Web server on the Internet N in accordance with a command inputted by the viewer through the keyboard 12, or receives an e-mail addressed to the viewer from a POP (Post Office Protocol) server and displays a content of the e-mail on the display 20 (corresponding to display means acquiring information from outside of the system and displaying the acquired information on a screen). On this occasion, the same Web data or the same e-mail data is inputted also to the information content analyzing module 38.

The EPG analyzing module 32 analyzes the EPG data separated by the tuner 11, then extracts the program information including a program name, start date/time, a program length, a genre, program details (program contents) and a channel with respect to each of the on-broadcasting programs and the programs scheduled to be broadcasted from now onward, and notifies respectively the reservation recording module 33 and the information content analyzing module 38 of the extracted program information. Note that the EPG data is, in addition to being carried on the broadcasting signals, distributed via the Internet N. Accordingly, the EPG analyzing module 32 receives the EPG data acquired via the Internet N by the information browse processing module 22, and analyzes the EPG data in the same way as described above.

The reservation recording module (reservation recording means) 33 reserves the recording in a way that registers, in the reserved program EPG database 44, the program information for a program of which recording is demanded by the viewer among the respective programs of which program information is notified from the EPG analyzing module 32 according to a command inputted by the viewer via the keyboard 12. On this occasion, the reservation recording module 33 registers, in the restriction period setting information 46, a type of the restriction period (a condition of the restriction period designated by the viewer with respect to the program. Note that the reservation recording module 33 may reserve the recording through the manual operation by the viewer via the keyboard 12 without being based on the EPG data.

Further, the reservation recording module 33 always monitors the program information of the respective programs registered in the reserved program EPG database 44, and if it reaches the start time contained in any program information starts up the tuner 11 and sets to the tuner 11 a channel contained in the program information, and thereafter files the video data inputted from the tuner 11 within the time specified by the program length contained in the program information into the recording data 41, and stores the recording data 41 in the hard disk 18. The reservation recording module 33 records the program information of the thus-recorded program in the already-recorded program database 42.

FIG. 3 is a table showing a data structure of the reserved program EPG database 44 serving as a reserved program database. As shown in FIG. 3, the reserved program EPG database 44 is registered with records each associated with each of the recording-reserved programs. Then, each record consists of fields such as a "reservation number ID" defined as a serial number uniquely allocated to the associated reserved program by the reservation recording module 33 and respective items of program information (a program name, start date/time, a program length, a genre, program details and a channel) which are recorded in the way of being associated with the "reservation number ID".

FIG. 4 is a table showing a data structure of the already-recorded program database 42. As shown in FIG. 4, the already-recorded program database 42 is registered with records each associated with each of the already-recorded programs. Then, each record consists of, in addition to the reservation number ID of the associated already-recorded program and the contents of the program information, a flag showing whether or not the program is viewed (reproduced) after being recorded (an already-viewed flag, which is initially set OFF (OFF=not-yet-viewed status)).

FIG. 5 is a table showing a data structure of the restriction period setting information 46. As illustrated in FIG. 5, the restriction period setting information 46 has a record for every type of a restriction period enable to be set, wherein the record associated with each type of a restriction period contains predefinitions of a setting name and a setting content (a condition of the restriction period), and also registration of a reserved program ID of the program with the restriction period being set according to the type by the reservation recording module 33.

Referring back to FIG. 2, the associative program keyword extracting module 34 serving as the reserved program keyword extracting module (reserved program keyword extracting means) reads the reservation number ID and the detailed contents of the program for every record registered in the reserved program EPG database 44, then decomposes a detailed caption of the program by use of a known technique (morphological analysis etc.) into single words, and extracts a characteristic word as an "associative keyword" therefrom. Then, the associative program keyword extracting module 34 registers the program ID and the associative keyword in the associative keyword database 43.

FIG. 6 is a table showing a data structure of the associative keyword database 43 as the keyword database. As shown in FIG. 6, the associative keyword database 43 is registered with records each associated with the recording-reserved program. Then, each record consists of the reservation number ID of the associative already-recorded program and the associative keywords.

Referring back to FIG. 2, the program viewing module 31, based on the command inputted by the viewer via the keyboard 12, starts up the tuner 11 in a normal viewing mode (the direct viewing with no intermediary of video), sets the channel selected by the viewer, receives the video data of the on-broadcasting program at the set channel from the tuner 11, decodes the video data by use of the MPEG decoder 16, sequentially visualizes images of respective frames on the VRAM 15 on the basis of the decoded video data, thus displays the moving picture on the display 20, and outputs the sounds from the loudspeaker 21. When in the normal viewing mode, during a period for which the video data is inputted to the program viewing module 31 from the tuner 11, the EPG about the program is simultaneously inputted to the information content analyzing module 38. Namely, the EPG data about the program corresponds to the information acquired from outside of the system, and the program viewing module 31 corresponds to display means displaying a screen (which displays a moving picture of the program).

On the other hand, in a video viewing mode, the program viewing module 31 reads the recording data 41 of the program selected by the viewer from the hard disk 18, then, in the same way as described above, displays the moving picture on the display 20, and outputs the sounds from the loudspeaker 21. In the video viewing mode, after finishing reproducing any one of programs, the program viewing module 31 notifies the recorded program viewing status monitoring module 35 of this purport The recorded program viewing status monitoring module 35, while the program viewing module 31 is started up, always monitors notification given from the program viewing module 31, and, when receiving from the program viewing module 31 the notification that the reproduction of any one of programs has been finished, sets ON the already-viewed flag in the record registered in the already-recorded program database 42 with respect to this program.

The information content analyzing module 38 serving as the information content analyzing module (information content analyzing means) is started up each time the new EPG data (limited to the EPG data about the program related to the video data that is now inputted to the program viewing module 31) is inputted, or each time the new Web data or the new e-mail data is inputted. Then, the information content analyzing module 38, when the EPG data is inputted, notifies the program related information determining module 37 of the keyword extracted by analyzing a syntax of the details of the program. Further, the information content analyzing module 38, when the Web data is inputted, extracts a year/month/date of the data creation or a date of the last update and a keyword by analyzing the syntax of the Web data, and notifies the program related information determining module 37 of the extracted data. Determination about whether or not a character string of the year/month/date in the Web data represents the year/month/date of the data creation is done based on detecting whether or not a character string such as "Creation date:" and "Create time is" exists anterior to the character string "year/month/date" or whether or not a character string such as "has created in" exists posterior to the character string "year/month/date." Further, the determination about whether or not the character string of the year/month/date in the Web data represents the year/month/date of the update is done based on detecting whether or not a character string such as "Update time is" and "Date of the last update" exists anterior to the character string "year/month/date" or whether or not a character string such as "has been updated to" exists posterior to the character string "year/month/date." Incidentally, when the year/month/date of the data creation and the date of the last update are identified, the date of the last update is preferentially extracted. On the other hand, the information content analyzing module 38, when the e-mail data is inputted, notifies the program related information determining module 37 of transmission date/time extracted from a header of the e-mail data and a keyword extracted by analyzing the syntax of a mail text.

The associated information restriction period determining module 36 serving as a restriction period determining module (restriction period determining means) is starts up each time the new information is inputted. Then, the associated information restriction period determining module 36 registers, for every record registered in the reserved program EPG database 44, a recorded program ID of the program associated with this record in the restriction target program list 45, if the program associated with the record is not yet recorded (in other words, if only the same reservation program ID as that of the program is not registered in the already-recorded program database 42) or if only the program associated with the record has already been recorded (in other words, if the same reservation program ID of that of the program is registered in the already-recorded program database 42) but not yet viewed (or the already-viewed flag=OFF) and it is within the restriction period set in the program (in other words, the last day of the restriction period determined by the "start date/time" and the "setting contents" is later than present date/time onward). Note that the associated information restriction period determining module 37 directly notifies the program related information determining module 37 of the "start date/time" associated with the recorded program ID registered in the restriction target program list 45.

FIG. 7 is a table showing a data structure of the restriction target program list 45. As illustrated in FIG. 7, in the restriction target program list, the recorded program IDs of the recorded programs set as the restriction target program by the associated information restriction period determining module 36 are listed up.

Referring back to FIG. 2, the program related information determining module 37 serving as the related information determining module (related information determining means) calculates an association level between the associative keywords registered in the associative keyword database 43 and the keywords notified from the information content analyzing module 38 with respect to every recorded program of which recorded program ID is registered in the restriction target program list 45. Herein, the association level is an index for indicating how much the two keywords are similar, and is calculated as a ratio of associative keyword(s) of which synonymous or a near-synonym is included in the latter keyword to the whole of the former associative keywords. Note that the program related information determining module 37 excludes, if the associative keyword inputted from the information content analyzing module 38 is based on the Web data or the e-mail data, the recorded programs of which start date/time directly notified from the associated information restriction period determining module 36 is later than the year/month/date of the data creation or the transmission date/time thereof from the association level calculation target, because of there being no risk that the result might be disclosed from that information. Then, if the association level calculated about any one of the recorded programs exceeds a predetermined threshold value with respect to the information with the associative keyword which the information content analyzing module 38 notifies of, the program related information determining module 37 requests the alarm issuing module 39 to issue an alarm.

The alarm issuing module (alarm issuing means) 39 instructs, if the information inputted to the information content analyzing module 38 is the EPG data, the program viewing module 31 to display an alarm message on the display 20, and gets the alarm sound output from the loudspeaker 21. Moreover, the alarm issuing module 39 instructs, if the information inputted to the information content analyzing module 38 is the Web data or the e-mail data, the information browse processing module 40 to display the alarm message on the display 20. Incidentally, the alarm message issuing module 39 cancels, when a cancellation command is inputted by the viewer via the keyboard 12 (in other words, when the viewer clicks on a cancellation button set for the alarm message), the output instructions of the alarm message and the alarm sound, which are given to the program viewing module 31 or the information browse processing module 40.

(Processes Based on Programs)

In the respective functions given above outlines of the operations of the reserved program keyword extracting module 34, the recorded program viewing status monitoring module 35, the associated information restriction period determining module 36, the program related information determining module 37, the information content analyzing module 38 and the alarm issuing module 39 (i.e., the contents of the processes executed by the CPU 10 according to the various categories of programs 30 in the hard disk 18 in order to actualize these functions), will hereinafter be described by way of a few working examples.

FIRST WORKING EXAMPLE

Figure 8:
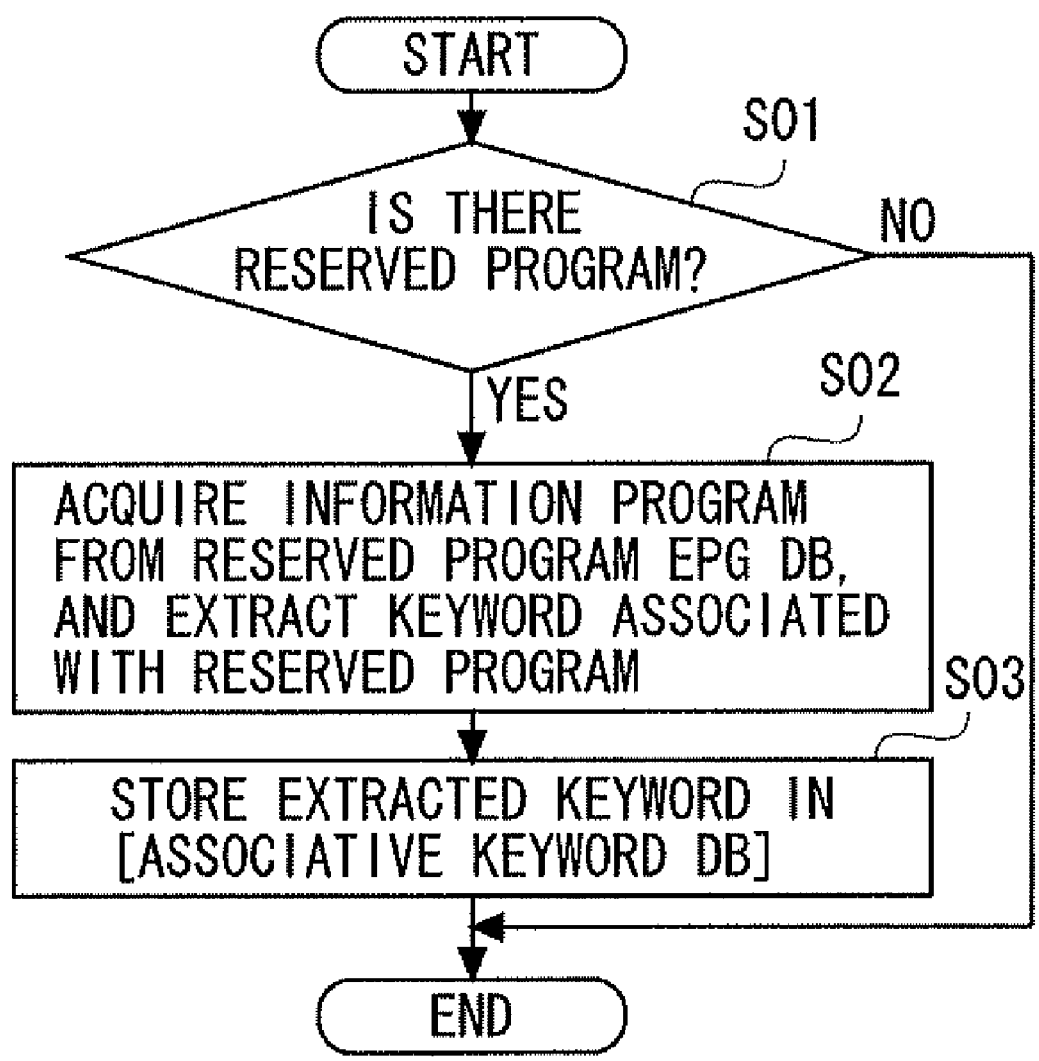
FIG. 8 is a flowchart showing a process equivalent to a reserved program keyword extracting module.

A process in FIG. 8 is a process for realizing the function of the reserved program keyword extracting module 34. This process repeatedly starts at intervals of a fixed cycle. Then, in first step S01, the CPU 10 functioning as the reserved program keyword extracting module 34 (which will hereinafter be simply termed the "reserved program keyword extracting module 34") checks whether or not a new record (reserved program) is registered in the reserved program EPG database 44, and finishes the process as it is if the new reserved program is not registered but advances the process to S02 whereas if the new reserved program is registered.

In 502, the reserved program keyword extracting module 34 reads the program information (the details of the program) in the newly-registered record from the reserved program EPG database 44, and extracts associative keywords from the details of the program for every reserved program.

In next step S03, the reserved program keyword extracting module 34 registers the reserved program ID and the associative keywords in the associative keyword database 43 in a way that associates the ID and the keyword with each other for every reserved program of which associative keywords are extracted in S02. Upon completing the operation in S03, the reserved program keyword extracting module 34 finishes the process for realizing (the function of the reserved program keyword extracting module 34.

Figure 9:
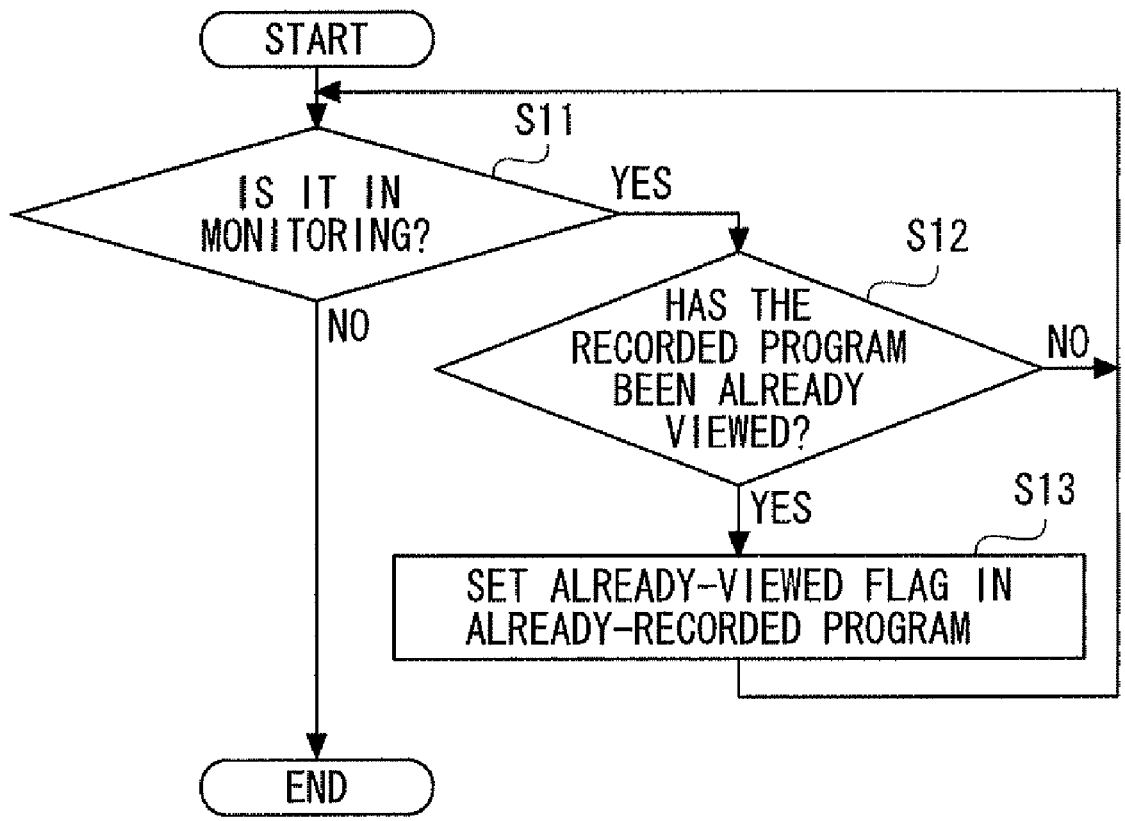
FIG. 9 is a flowchart showing a process equivalent to a recorded program viewing status monitoring module.

FIG. 9 shows a process for realizing the function of the recorded program viewing status monitoring module 35. The CPU 10 functioning as the recorded program viewing status monitoring module 35 (which will hereinafter be simply termed the "recorded program viewing status monitoring module 35") continues to check the notification given from the program viewing module 31 by repeating a loop of S11 and S12 as far as the recorded program viewing status monitoring module 35 keeps monitoring (S11: yes) and, in S13, sets "ON" the already-viewed flag in the record registered in the already-recorded program database 42 with respect to the recorded program about which the program viewing module 31 notifies of a purport that the program has already been viewed (S12: yes).

Figure 10:
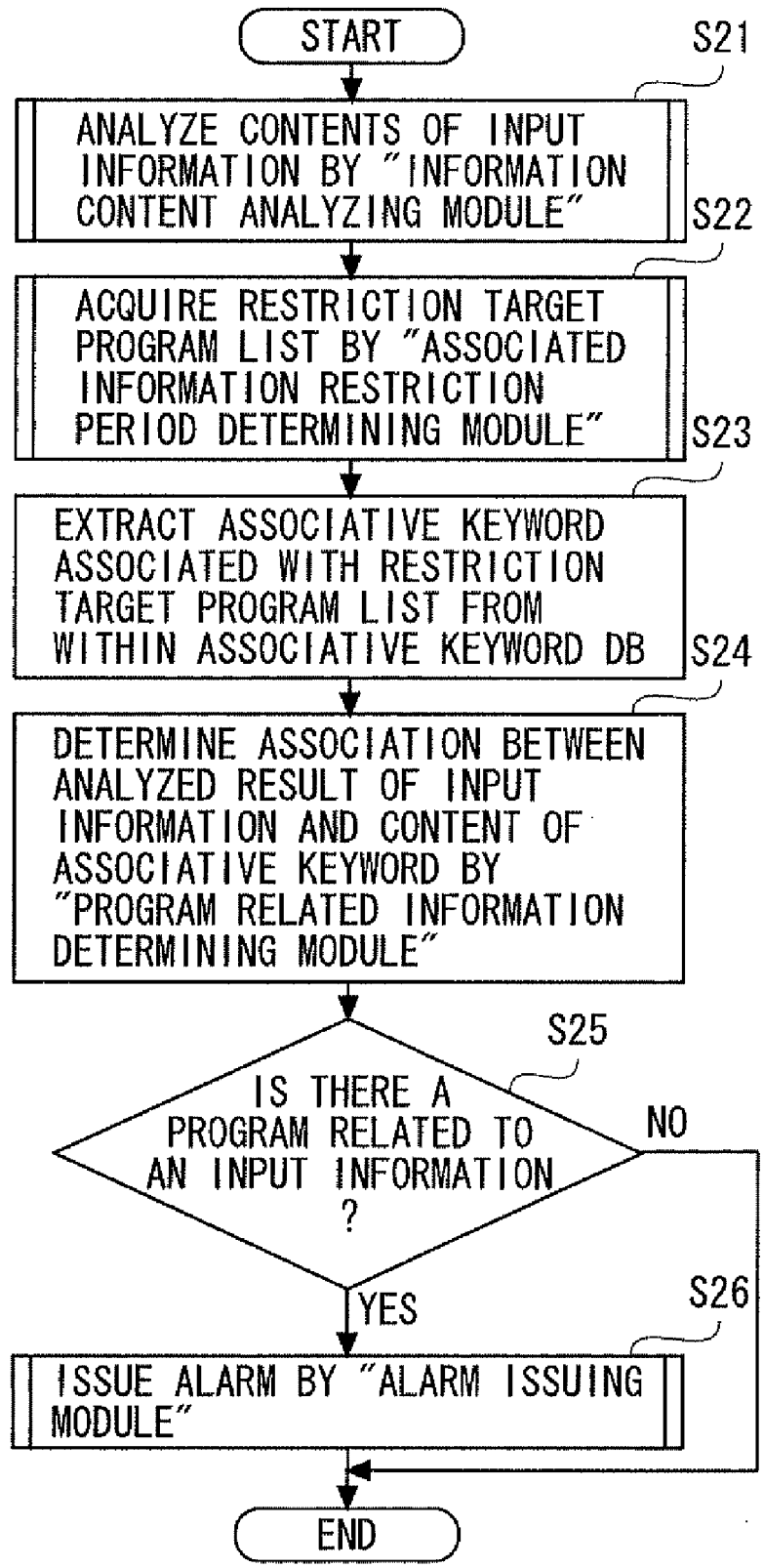
FIG. 10 is a flowchart showing a first working example of processes equivalent to an information content analyzing module, an associated information restriction period determining module and a program related information determining module.

FIG. 10 shows a process for actualizing (the functions of) the associated information restriction period determining module 36, the program related information determining module 37, the information content analyzing module 38 and the alarm issuing module 39. A start of this process is triggered by inputting the EPG data to the CPU 10 functioning as the information content analyzing module 38 (which will hereinafter be simply termed the "information content analyzing module 38"). Then, in first step S21 after the start, the information content analyzing module 38, as described above, extracts keywords from the details of the program of the inputted EPG data.

In next step S22, the CPU 10 functioning as the associated information restriction period determining module 36 (which will hereinafter be simply termed the "associated information restriction period determining module 36") executes a subroutine shown in FIG. 11. In first step S31 after entering the subroutine, the associated information restriction period determining module 36 checks whether or not the process from S32 onward has been completed with respect to all the programs registered in the reserved program EPG database 44 since the process of this time has been started. Then, if the process is not yet completed with respect to all the programs, the associated information restriction period determining module 36 advances the process to S32.

In S32, the associated information restriction period determining module 36 selects one program (that is, record) which has not yet processed.

In next step S33, the associated information restriction period determining module 36 checks whether or not the program (that is, record) selected in S32 is the already-recorded program on the basis of detecting whether or not the same reserved program ID in this record is registered in the already-recorded program database 42. Then, the associated information restriction period determining module 36 advances the process directly to S35 if it is not the already-recorded program or advances the process to S34 if it is the already-recorded program.

In S34, the associated information restriction period determining module 36 checks whether or not the recorded program selected in S32 has already been viewed, based on detecting whether or not the already-viewed flag in the record in the already-recorded program database 42 with respect to this recorded program is set ON. Then, the associated information restriction period determining module 36 advances the process to S38 if it has already viewed (in case the already-viewed flag=ON) or advances the process to S35 if it has not yet viewed (in case the already-viewed flag OFF).

In S35, the associated information restriction period determining module 36 determines whether or not the program selected in S32 is within the present restriction period by detecting whether or not the last day of the restriction period determined based on the "start date/time" in the record in the already-recorded program database 42 and the "setting contents" associated with the reserved program ID of the program in the restriction period setting information 46 is posterior to the present date/time. Then, the associated information restriction period determining module 36 advances the process to S38 if the program is not within the present restriction period or advances the process to S37 if the program is within the present restriction period.

In S37, the associated information restriction period determining module 36 registers the reserved program ID of the program selected in S32 in the restriction target program list 45. After completing the operation in S37, the associated information restriction period determining module 36 advances the process to S38.

In S38, the associated information restriction period determining module 36 temporarily stores the RAM 14 with the program selected in S32 as its being already processed.

In the case of completing the process about all the programs registered in the reserved program EPG database 44, as a result of repeating the loop process of S31 through S38, the associated information restriction period determining module 36 terminates the subroutine and returns to the main routine in FIG. 10.

In the main routine in FIG. 10, the process proceeds to S23 from S22. In S23, the CPU 10 functioning as the program related information determining module 37 (which will hereinafter be simply referred to as the "program related information determining module 37") reads, according to every reserved program ID registered in the restriction target program list 45, the associative keywords registered in the associative keyword database 43 in the way of being associated with the same reserved program ID.

In next step S24, the program related information determining module 37 respectively calculates, for every reserved program ID, the association level between the associative keyword group associated with the reserved program ID read from the associative keyword database 43 and the associative keyword group extracted from the input information (EPG data) in S21. If there is the reserved program ID with thus calculated association level being in excess of a predetermined threshold value, the program specified by this associative keyword is set as a "program related to the input information."

In next step S25, the program related information determining module 37 checks whether or not "the program related to the input information" proves to exist as a result in S24. Then, if the "program related to the input information" does not exist, the CPU 10 terminates all the main routine. Whereas if even one "program related to the input information" exists, the CPU 10 advances the process to S26.

In S26, the CPU 10 functioning as the alarm issuing module 39 instructs the program viewing module 31 to display an alarm message on the display 20, and gets the alarm sound output from the loudspeaker 21. When completing the operation in S26, the CPU 10 terminates all the main routine.

According to the first working example having the configuration described above, when the viewer views the now-on-broadcasting program at any one of the channels, the EPG data about this program is inputted to the CPU 10, the keywords is extracted from the details of the program in the EPG data by the function of the information content analyzing module 38, and the function of the program related information determining module 37 determines whether or not the program related to the extracted keywords are reserved. On this occasion, the determination target program is selected from all of the reserved programs (all of the programs registered in the reserved program EPG database 44 are the target of the processing in S31-S33). Namely, in the reserved programs which has not yet been recorded (S33: a case of NO) and the recorded programs which has not yet been recorded (S33: a case of YES, and S34: a case of NO), only the programs existing within restriction period predefined by the restriction period setting information are finally selected as the determination target programs (S36: a case of YES).

Thus, reserved programs which has not yet been recorded can be set as the determination target programs, and hence, for example, even when the recording target program is a broadcast recording program, the alarm can be issued to a sports news program that reports a result of a game before starting the program.

Further, the viewer can set the restriction period in the restriction period setting information 46 without any restraint when reserving the recording of the individual program, and hence, for example, the restriction period for a sports broadcast, which is important in terms of freshness of the information, can be set short, while the restriction period for a drama program etc., in which the information freshness is not a matter of concern, can be set long, thus enabling the restriction period to be set corresponding to an attribute of the program.

Then, with respect to each determination target program selected finally as the restriction target program, the association level between the associative keywords registered in the associative keyword database 43 and the keywords about the now-viewing program (or the program scheduled for viewing immediately after) is individually calculated, and, if there is even one reserved program with the calculated association level exceeding the predetermined threshold value, the alarm is output to the now-viewing program (or the program scheduled for viewing immediately after). Hence, the viewer avoids accessing the related information about the recorded program before viewing the recorded program and is therefore enabled to view the recorded program without loosing an interest.

Note that the recorded program over the restriction period is excluded from the determination target program, and therefore it does not happen any more that the alarm is issued, even if a program having the high association level with the associative keyword of the excluded program is on the verge of being broadcasted (as far as there are no other programs each having the high association level within the restriction period). Accordingly, even if there remains the recorded program that the viewer failed to view with less of the freshness, the viewer can view the now-broadcasting program without being annoyed by this.

SECOND WORKING EXAMPLE

Figure 12:
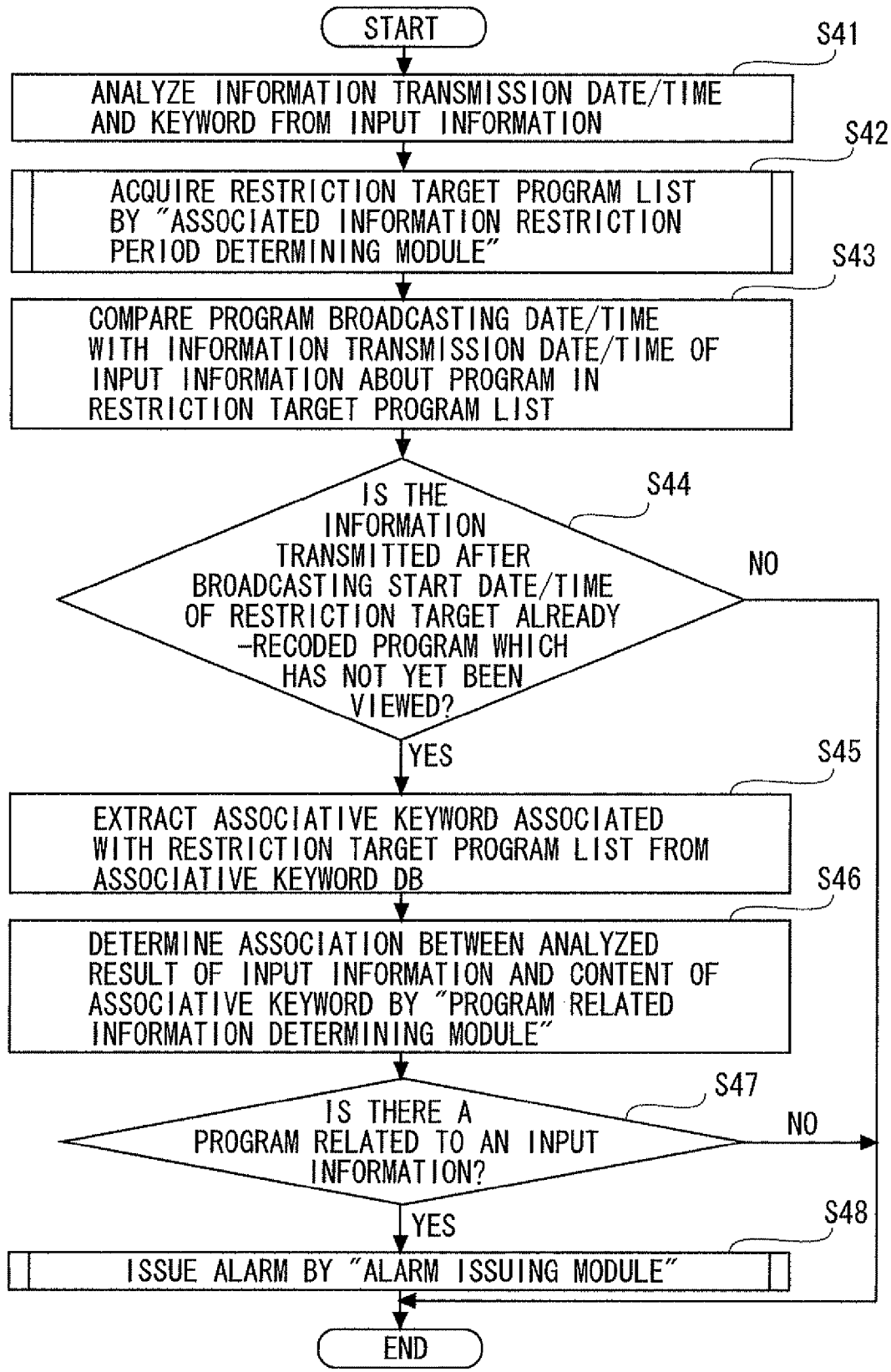
FIG. 12 is a flowchart showing a second working example of the processes equivalent to the information content analyzing module, the associated information restriction period determining module and the program related information determining module.

FIG. 12 is a flowchart showing a second working example. Note that the flowchart in FIG. 12 shows only the outlines of the operations (i.e., the contents of the processes executed by the CPU 10 according to the various categories of programs 30 in the hard disk 18 in order to actualize these functions) of the associated information restriction period determining module 36, the program related information determining module 37, the information content analyzing module 38 and the alarm issuing module 39, and corresponds to FIG. 10 in the first working example. Accordingly, the operations of the reserved program keyword extracting module 34 and the recorded program viewing status monitoring module 35 are the same as those in the first working example.

The process in FIG. 12 starts each time the new Web data, the new e-mail data or the new EPG data is inputted to the CPU 10 functioning as the information content analyzing module 38 (which will hereinafter be simply referred to as the "information content analyzing module 38"). Then, in first step S41 after the start, the information content analyzing module 38 analyzes the information transmission date/time of the inputted information. To be specific, as described above, the transmission date/time is extracted from the header in the case of the e-mail, the creation date/time or the date/time of the update is extracted in the case of the Web data, and the broadcasting date/time (the present date/time) is specified in the case of the EPG data. Further, the information content analyzing module 38 extracts, as explained above, the keyword from the inputted e-mail, the Web data or the details of the program of the EPG data.

In next step S42, the CPU 10 functioning as the associated information restriction period determining module 36 (which will hereinafter be simply referred to as the "associated information restriction period determining module 36" executes a subroutine shown in FIG. 11 (which has already been explained). Upon completing the operation in S42, the CPU 10 advances the process to S43.

In S43, the CPU 10 functioning as the program related information determining module 37 (which will hereinafter be simply termed the "program related information determining module 37") reads, for every reserved program ID registered in the restriction target program list 45, the start date/time registered in the already-recorded program database 42 in the way of being associated with the identical reserved program ID. Then, in S41, the information transmission date/time (the transmission date/time of the e-mail, the creation date/time or the date/time of the update of the Web data, and the broadcasting date/time) analyzed in S41 is compared with the start date/time read from the already-recorded program database 42.

In next step S44, the program related information determining module 37 checks whether or not the information transmission date/time analyzed in S41 is posterior to any one of start date/time data read from the already-recorded program database 42 as a result of the comparison in S43. Then, if the information transmission date/time analyzed in S41 is anterior to all of the start date/time data read from the already-recorded program database 42, this information has a low possibility that the contents of the already-recorded programs might be disclosed, and therefore all the main routine is completed. By contrast, if the information transmission date/time analyzed in S41 is posterior to any one of the start date/time data read from the already-recorded program database 42, there is the possibility that the contents of any one of the recorded programs might be disclosed through this information, and hence the program related information determining module 37 advances the process to S45.

In S45, the program related information determining module 37 reads, for every reserved program ID registered in the restriction target program list 45, the associative keyword registered in the associative keyword database 43 in the way of being associated with the identical reserved program ID.

In next step S46, the program related information determining module 37, calculates, for every reserved program ID, the association level between the associative keyword group read from the associative keyword database 43 in the way of being associated with the reserved program ID and the associative keyword group extracted from the input information (the e-mail data, the Web data or the EPG data) in S41. If there is the reserved program ID thus calculated association level exceeding the predetermined threshold value, the program specified by this reserved program ID is set as the "program related to the input information".

In next step S47, the program related information determining module 37 checks whether or not the "program related to the input information" proves to exist as a result in S46. Then, if the "program related to the input information" does not exist, the CPU 10 terminates all the main routine.

Whereas if even one "program related to the input information" exists, the CPU 10 advances the process to S48.

In S48, the CPU 10 functioning as the alarm issuing module 39 instructs the program viewing module 31 to display the alarm message on the display 20, and gets the alarm sound output from the loudspeaker 21. When completing the operation in S46, the CPU 10 finishes all the main routine.

According to the second working example having the configuration described above, in the same way as by the first working example, when the viewer views the on-broadcasting program at any one of the channels and if there is the possibility that the contents of any one of the recorded programs which has not yet been viewed within the restriction period might be disclosed, the alarm is to be issued. Further, when the viewer receives the e-mail or the Web data via the Internet N and if there is the possibility that the contents of any one of the recorded programs which has not yet been viewed within the restriction period might be disclosed, the alarm is to be similarly issued. If the transmission date/time of the received e-mail or the creation date/time of the Web data or the date/time of the update is earlier than all of the broadcasting start date/time, there is a low possibility of the existence of the recorded programs of which contents might be disclosed through the e-mail or the Web data. In such a case, a processing load is reduced by checking none of the keywords.

THIRD WORKING EXAMPLE

Figure 13:
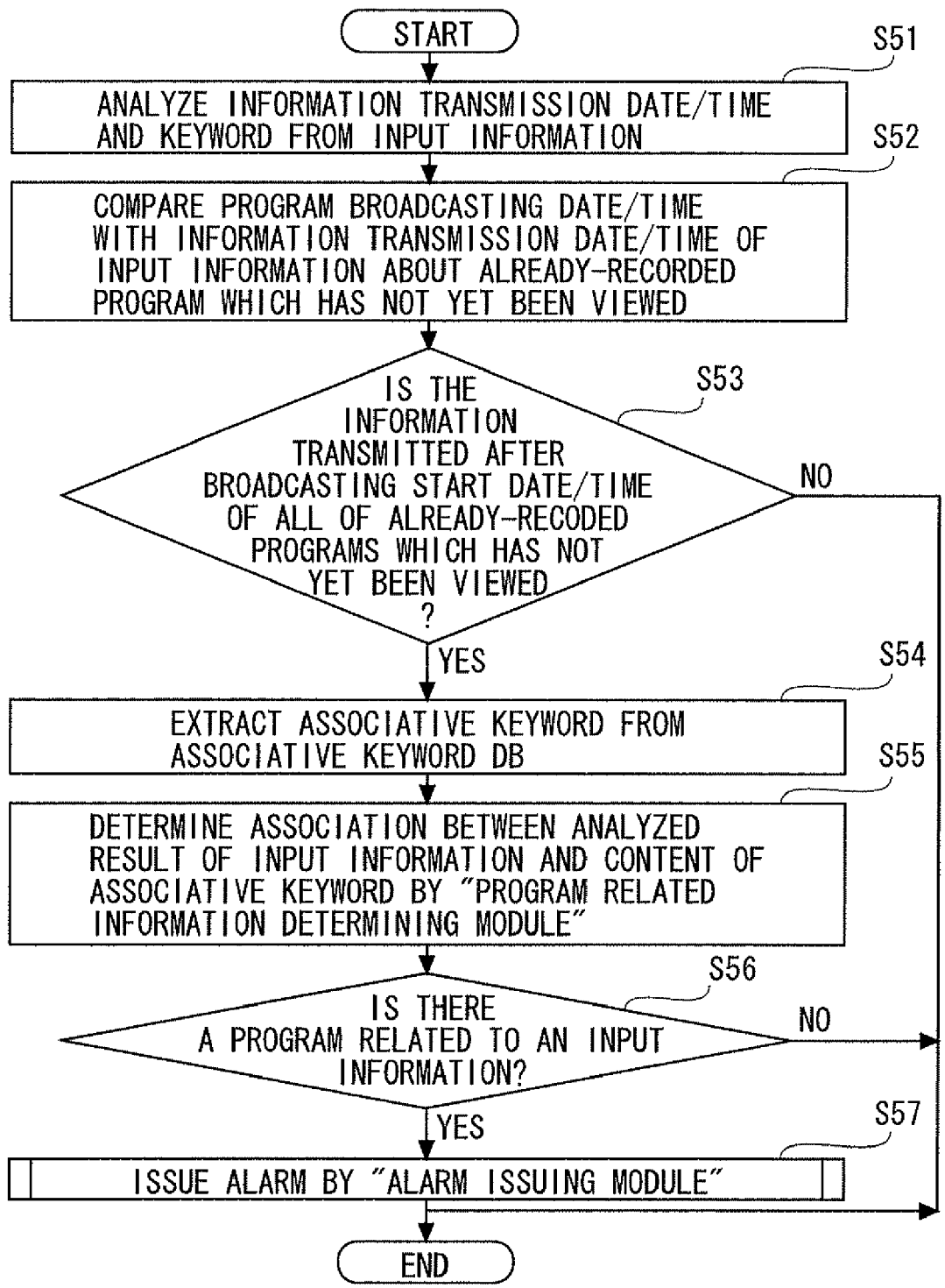
FIG. 13 is a flowchart showing a third working example of the processes equivalent to the information content analyzing module, the associated information restriction period determining module and the program related information determining module.

FIG. 13 is a flowchart showing a third working example. Note that the flowchart in FIG. 13 shows only the outlines of the operations (i.e., the contents of the processes executed by the CPU 10 according to the various categories of programs 30 in the hard disk 18 in order to actualize these functions) of the associated information restriction period determining module 36, the program related information determining module 37, the information content analyzing module 38 and the alarm issuing module 39, and corresponds to FIG. 10 in the first working example. Accordingly, the operations of the reserved program keyword extracting module 34 and the recorded program viewing status monitoring module 35 are the same as those in the first working example.

Figure 11:
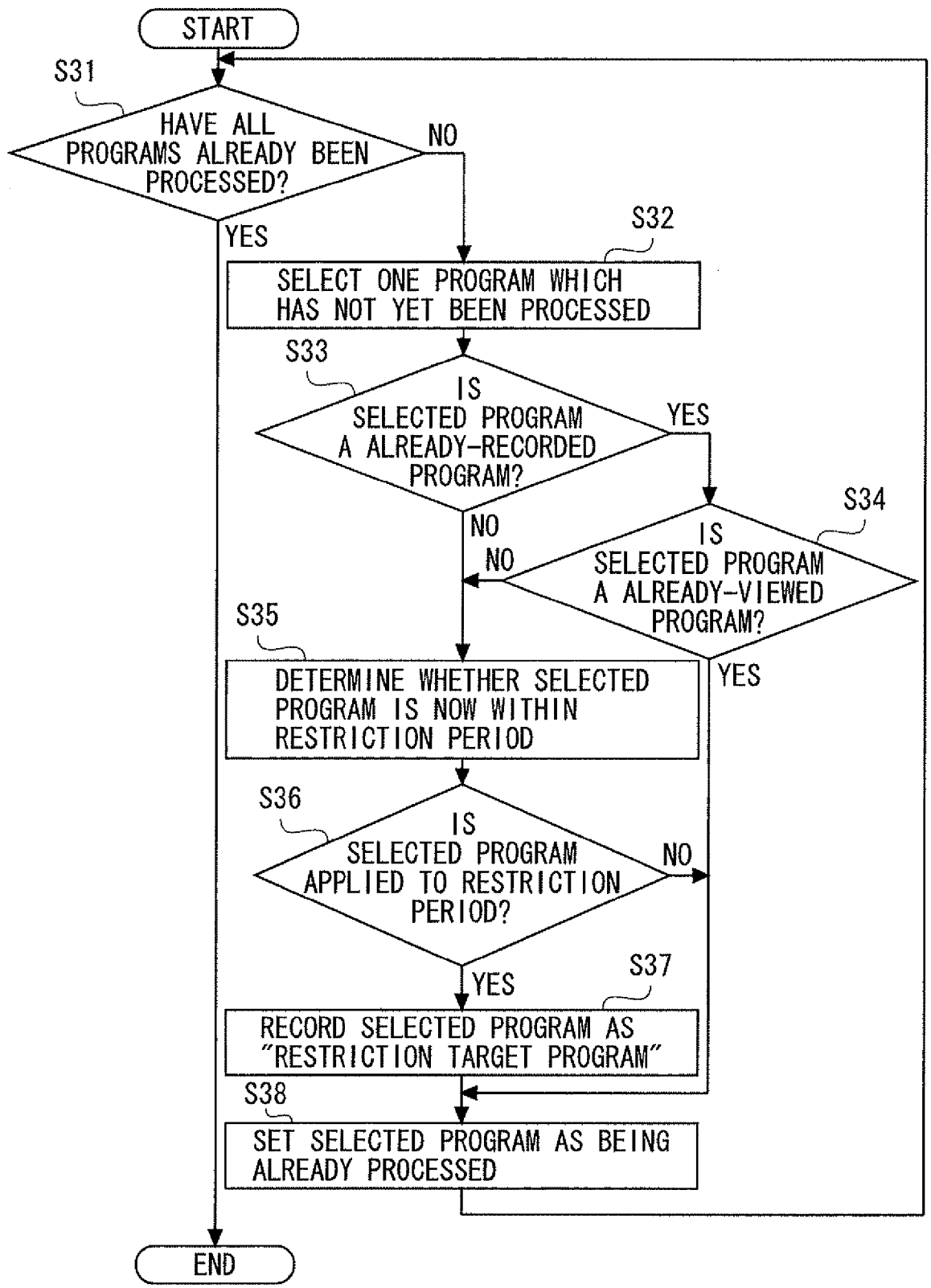
FIG. 11 is a flowchart showing a subroutine executed in S22.

The process in FIG. 13 has, as compared with FIG. 12 according to the second working example, none of the process corresponding to S42 (i.e., there is none of the process corresponding to the subroutine in FIG. 11). This difference leads to a slight difference of the process from S52 onward in FIG. 13 from the process in FIG. 11. The following is a specific description thereof.

To begin with, the information content analyzing module 38, when the new Web data, the new e-mail data or the EPG data is inputted, analyzes the information transmission date/time of the inputted information in S51 in the same way as in S41 of FIG. 12.

In next step S52, the program related information determining module 37 reads the start date/time of all of the recorded programs registered in the already-recorded program database 42. Then, the information transmission date/time (the transmission date/time of the e-mail, the creation date/time or the date/time of the update of the Web data, the broadcasting date/time) analyzed in S51, is compared with each start date/time read from the already-recorded program database 42.

In next step S53, the program related information determining module 37 checks whether or not the information transmission date/time analyzed in S51 is posterior to any one of start date/time data read from the already-recorded program database 42 as a result of the comparison in S52. Then, if the information transmission date/time analyzed in S51 is anterior to all of the start date/time data read from the already-recorded program database 42, this information has a low possibility that the contents of the already-recorded programs might be disclosed, and therefore all the main routine is completed. By contrast, if the information transmission date/time analyzed in S51 is posterior to any one of the start date/time data read from the already-recorded program database 42, there is the possibility that the contents of any one of the recorded programs might be disclosed through this information, and hence the program related information determining module 37 advances the process to S54.

In S54, the program related information determining module 37 reads, for every reserved program ID registered in the already-recorded program database 42, the associative keywords registered in the associative keyword database 43 in the way of being associated with the identical reserved program ID.

In next step S55, the program related information determining module 37 calculates, for every reserved program ID, the association level between the associative keyword group associated with the reserved program ID read from the associative keyword database 43 and the associative keyword group extracted from the input information (the e-mail data, the Web data or the EPG data) in S51. If there is the reserved program ID with thus calculated association level exceeding the predetermined threshold value, the program specified by this reserved program ID is set as the "program related to the input information".

In next step S56, the program related information determining module 37 checks whether or not the "program related to the input information" proves to exist as a result in S55. Then, if the "program related to the input information" does not exist, the CPU 10 terminates all the main routine. Whereas if even one "program related to the input information" exists, the CPU 10 advances the process to S57.

In S57, the CPU 10 functioning as the alarm issuing module 39 instructs the program viewing module 31 to display the alarm message on the display 20, and gets the alarm sound output from the loudspeaker 21. When completing the operation in S56, the CPU 10 finishes all the main routine.

According to the third working example having the configuration described above, in the same way as by the second working example, if the transmission date/time of the received e-mail or the creation date/time or the date/time of the update of the Web data is earlier than the broadcasting start date/time of all of the recorded programs, the processing load is reduced by checking none of the keywords.

MODIFIED EXAMPLE

The broadcast receiving system 1 according to the embodiments discussed above is the system packaged into one single housing (or alternatively, the display 20 and the loudspeaker 21 or the tuner 11 are housed into the separate housings). For monitoring the e-mail and the Web data received via the Internet N as in the first and second working examples, however, it is desirable that a proxy server existing between the broadcast receiving system 1 and the Internet N has the functions of the reserved program keyword extracting module 34, the recorded program viewing status monitoring module 35, the program related information determining module 37, the information content analyzing module 38 and the alarm issuing module 39 and the various categories of data of the associative keyword database 43, the already-recorded program database 42, the restriction period setting information 46 and the restriction target program list 45. In this case, when receiving the e-mail or the Web data via the Internet N in response to a request given from the information browse processing module 40 of the broadcast receiving system 1, the proxy server determines, before transferring the e-mail or the Web data to the information browse processing module 40 of the broadcast receiving system 1, whether or not the e-mail or the Web data is what discloses the contents of any one of the recorded programs, then, if the e-mail or the Web data is of such a kind stores the e-mail or the Web data in a temporary storage area, and transfers an e-mail (HTML (HyperText Markup Language) mail) or Web data described with an alarm and a link item to the original e-mail or the original Web data stored within the temporary storage area to the information browse processing module 40. Accordingly, if the viewer desires by the viewer's own intention to browse the content of the e-mail or the Web data, the link item is manipulated by use of the information browse processing module 40, whereby the viewer can access the content of the e-mail or the Web data.

All or a part of the reserved program EPG database 44, the already-recorded program database 42, the restriction period setting information 46 and the restriction target program list 45 may be organized into one database. For example, a scheme is that information (a flag etc.) showing whether already recorded or not, the already-viewed flag (see FIG. 4), a setting content of the restriction period and information (a flag etc.) showing whether the program is the restriction target program or not, may be added to the contents of the respective records in the reserved program EPG database shown in FIG. 3.

I claim:

1. A broadcast receiving system receiving and recording a broadcasted program in a storage device, comprising:
   a reservation module to register a channel and a broadcasting time zone of a program designated by a user in a reserved program database, and to register in a storage a restriction period for the program, the restriction period being selected by the user from preset restriction periods each defining a period from current time during which an alarm is to be issued when another program which may disclose contents of the program is displayed;
   a keyword extracting module, for each program, the channel and the broadcasting time zone of which are registered in the reserved program database, to extract keywords from broadcasted electronic program information and to register the keywords in a keyword database;
   a display device to acquire information from outside of said system and to display information on a screen based on the acquired information;
   an information analyzing module to analyze a content of the information acquired by the display device and to extract keywords from the information;
   a checking target determining module to determine as a checking target, each program, the channel and the broadcasting time zone of which are registered in the reserved program database and the restriction period for which has not yet expired;
   an associated information determining module to calculate an association level between the keywords registered in the keyword database for each program determined as the checking target by the checking target determining module and the keywords extracted by the information analyzing module, and to determine whether or not there is at least one program with the calculated association level exceeding a predetermined threshold value; and
   an alarm issuing module to issue an alarm when the associated information determining module determines that there is at least one program with the association level exceeding the threshold value.

2. The broadcast receiving system according to claim 1, wherein the display device acquires a program now on broadcasting and electronic program information on the program and displays a content of the program on the screen, and the information analyzing module analyzes the content of the electronic program information acquired by the display device.

3. The broadcast receiving system according to claim 1, wherein the display device acquires information via the Internet, and displays a content of the information on the screen.

4. The broadcast receiving system according to claim 3, wherein the information analyzing module further extracts transmission time from the information acquired by the display device, the associated information determining module makes determination except a case in which the transmission time extracted by the information analyzing module is earlier than broadcasting time zones of all the programs registered in the reserved program database.

5. The broadcast receiving system according to claim 4, wherein the information acquired by the display device is an electronic mail.

6. The broadcast receiving system according to claim 4, wherein the information acquired by the display device is Web data.

7. A computer readable medium storing a computer program read and executed by a computer including a tuner receiving broadcasting signals, a storage device and a communication device connected to a network and having a function of recording video signals in the broadcasting signals received by the tuner on the storage device, and a function of acquiring information via the communication device, the computer program makes the computer execute:
   registering a channel and a broadcasting time zone of a program designated by a user in a reserved program database, and registering in a storage a restriction period for the program, the restriction period being selected by the user from preset restriction periods each defining a period from current time during which an alarm is to be issued when another program which may disclose contents of the program is displayed;
   extracting, for each program, the channel and the broadcasting time zone of which are registered in the reserved program database, keywords from broadcasted electric program information and registering the keywords in a keyword database;
   displaying information acquired via the communication device on a screen;
   extracting keywords from the information acquired by the communication device;
   determining as a checking target, each program, the channel and the broadcasting time zone of which are registered in the reserved program database and the restriction period for which has not yet expired;
   calculating an association level between the keywords registered in the keyword database for each program determined as the checking target and the keywords extracted from the information acquired by the communication device; and
   issuing, if there is at least one program with the association level exceeding the threshold value, an alarm showing this purport.

8. A method executed by a broadcast receiving system including a tuner receiving broadcasting signals, a storage device and a communication device connected to a network and having a function of recording video signals in the broadcasting signals received by the tuner on the storage device, the method comprising:

registering a channel and a broadcasting time zone of a program designated by a user in a reserved program database, and registering in a storage a restriction period for the program, the restriction period being selected by the user from preset restriction periods each defining a period from current time during which an alarm is to be issued when another program which may disclose contents of the program is displayed;

extracting, for each program, the channel and the broadcasting time zone of which are registered in the reserved program database, keywords from broadcasted electric program information and registering the keywords in a keyword database;

extracting, when information is acquired by the communication device, keywords from the information;

determining as a checking target, each program, the channel and the broadcasting time zone of which are registered in the reserved program database and the restriction period for which has not yet expired;

calculating an association level between the keywords registered in the keyword database for each program determined as the checking target and the keywords extracted from the information acquired by the communication device; and issuing, if there is at least one program with the association level exceeding the threshold value, an alarm showing this purport.

* * * * *